United States Patent [19]

Inoue

[11] Patent Number: 4,469,650
[45] Date of Patent: Sep. 4, 1984

[54] SPECIAL CARBON MATERIAL

[75] Inventor: Kiyoshi Inoue, Tokyo, Japan

[73] Assignee: Inoue-Japax Research Incorporated, Yokohama, Japan

[21] Appl. No.: 550,984

[22] Filed: Nov. 10, 1983

Related U.S. Application Data

[63] Continuation of Ser. No. 348,237, Feb. 12, 1982, abandoned.

[30] Foreign Application Priority Data

Feb. 16, 1981 [JP] Japan ................................. 56-20185

[51] Int. Cl.$^3$ ......................... B29C 3/00; B29C 11/00
[52] U.S. Cl. ..................................... 264/27; 264/234; 264/313; 264/320; 264/345
[58] Field of Search .................. 264/29.1, 29.5, 29.6, 264/29.7, 313, 27, 234, 319, 345, 109

[56] References Cited

U.S. PATENT DOCUMENTS

| | | | |
|---|---|---|---|
| 2,594,226 | 4/1952 | Shea et al. | 264/29.3 |
| 3,001,237 | 9/1961 | Balaguer | 264/27 |
| 3,246,056 | 4/1966 | Shea et al. | 264/313 |
| 3,249,968 | 5/1966 | Shaler | 264/29.1 |
| 3,265,798 | 8/1966 | Lyle | 264/29.1 |
| 3,271,502 | 9/1966 | Wentorf | 264/320 |
| 3,313,597 | 4/1967 | Cranch et al. | 264/27 |
| 3,346,681 | 10/1967 | White et al. | 264/29.1 |
| 3,409,451 | 11/1968 | Zeitsch | 264/29.1 |
| 3,440,311 | 4/1969 | Olstowski et al. | 264/29.1 |
| 3,448,181 | 6/1969 | Olstowski et al. | 264/313 |
| 3,492,197 | 1/1970 | Olstowski et al. | 264/29.1 |
| 3,656,946 | 4/1972 | Inoue | 264/313 |
| 3,900,189 | 8/1975 | Elmgren et al. | 425/78 |
| 4,226,900 | 10/1980 | Carlson et al. | 427/228 |
| 4,264,556 | 4/1981 | Kumar et al. | 425/78 |

FOREIGN PATENT DOCUMENTS

| | | | |
|---|---|---|---|
| 608477 | 11/1960 | Canada | 264/29.7 |
| 723531 | 12/1965 | Canada | 264/29.1 |
| 855194 | 11/1970 | Canada | 264/29.1 |
| 1219714 | 1/1971 | United Kingdom . | |
| 2020639 | 11/1979 | United Kingdom . | |

Primary Examiner—Willard E. Hoag
Attorney, Agent, or Firm—Karl F. Ross; Herbert Dubno

[57] ABSTRACT

A high-hardness and high-strength carbon material is produced by disposing a body of graphite carbon, e.g. precompacted graphite or a mass of powdery graphite carbon, of a predetermined shape and dimension in a collapsible receptacle shaped and dimensioned to tightly retain the body therein, the receptacle being collapsible at least one-dimensionally under external pressure while holding the body against expansion. High pressure is applied to the body while the body is heated to an elevated temperature and for a sufficient period such as to cause a central region of the body to be liquefied and the remainder thereof to be sintered. While under continuous pressure, the body is cooled to give in carbon material.

9 Claims, 4 Drawing Figures

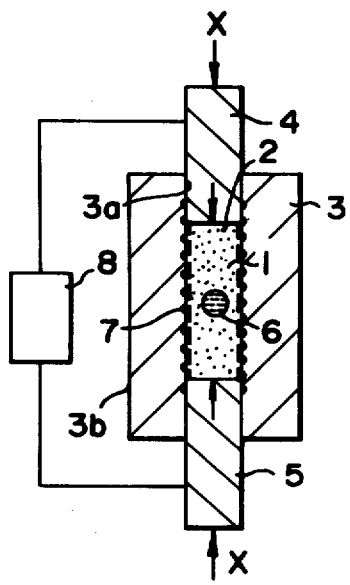
FIG. 1
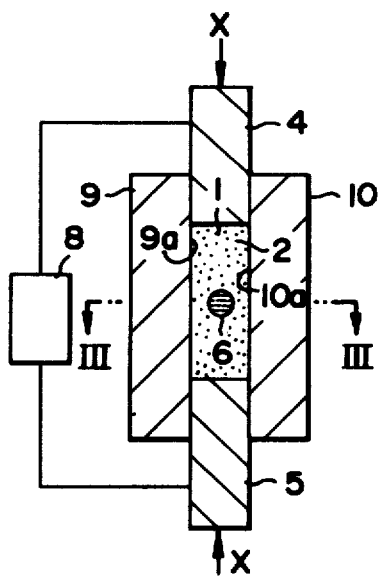
FIG. 2
FIG. 3
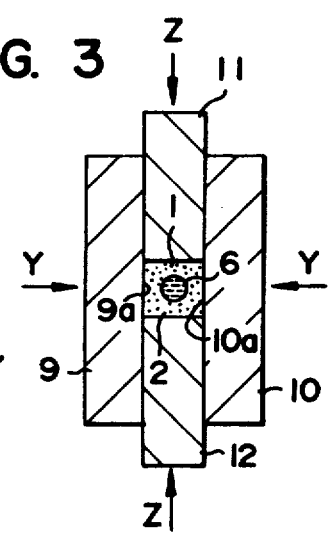
FIG. 4
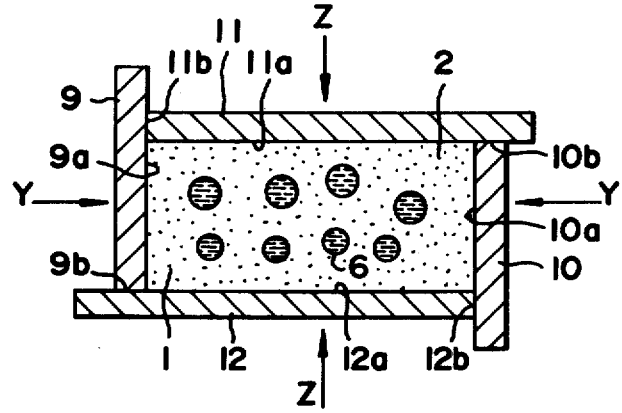

SPECIAL CARBON MATERIAL

This application is a continuation, of application Ser. No. 3,348,237, filed Feb. 12, 1982 and now abandoned.

FIELD OF THE INVENTION

The present invention relates to carbon material and, more particularly, to a method of forming shaped carbon material of high hardness and strength.

BACKGROUND OF THE INVENTION

Shaped carbon material has hitherto been produced by loading a mass of carbon powder into a suitable mold. The loaded carbon mass is compacted under pressure at a room temperature followed by heating to make the powder particles adherent to one another. A shaped block yielded from the preliminary treatment may then be subjected to a further compaction under simultaneous heating and pressurization. Various attempts have been made to increase the density and improve the quality of a final carbon product, including choice of binder materials and removal of volatile components contained in the raw carbon material. These prior techniques have, however, proved to be either unsatisfactory or inefficient. Carbon materials produced by the prior art have left much desired as to their quality, especially, as to hardness and strength. Furthermore, even carbon materials of inferior hardness, density and other quality factors could hardly be produced and reproduced with consistency as to these factors and, let alone, with reliability and efficiency.

OBJECTS OF THE INVENTION

It is accordingly an important object of the present invention to provide a new, efficient and reliable method of producing a shaped carbon material of high hardness, strength and density.

The present invention also seeks to provide a novel method which permits the consecutive production of shaped carbon materials of uniform high hardness, strength, density, size and other quality factors.

SUMMARY OF THE INVENTION

These and other objects is attained, in accordance with the present invention, by a method of forming a shaped carbon material, which method comprises the steps of: disposing a graphite carbon body of a predetermined shape and dimension in a collapsible receptacle shaped and dimensioned to tightly retain the body therein, the receptacle being collapsible at least one-dimensionally under external pressure while holding the body against expansion; applying a pressure externally of the receptacle to compress the body therein from the mutually opposite directions of at least one of three mutually orthogonal axes (X, Y and Z) to collapse and reduce the volume of the receptacle; heating the body retained in the collapsing receptacle to cause a central portion of the body while under continuous pressure to be selectively liquefied; and subsequently cooling the body while continuingly under pressurization to solidify the liquefied portion surrounded by a sintered matrix.

BRIEF DESCRIPTION OF THE DRAWING

These and other features of the present invention as well as advantages thereof will become more readily apparent from the following description made with reference to the accompanying drawing in which:

FIG. 1 is a sectional view in a elevation diagrammatically illustrating an arrangement for practicing the method of the invention in which pressure is applied to a cylindrical columnar carbon body retained in a conforming receptacle in opposite directions along the same axis;

FIG. 2 is a similar view illustrating another arrangement for forming a rectangular columnar carbon body according to the invention in which the receptacle is collapsible two-dimensionally;

FIG. 3 is a cross sectional view taken along line III—III in FIG. 2; and

FIG. 4 is a sectional view in elevation diagrammatically illustrating another arrangement for the practice of the invention in which pressure is applied to a carbon body along X-, Y- and Z-axes which are orthogonal to one another.

SPECIFIC DESCRIPTION

In FIG. 1 a graphite-carbon body 1 is disposed in and firmly retained within a collapsible receptacle 2 which has its predetermined initial volume conforming to the initial mass of the body 1. The receptacle 2 is cylindrical and defined by the wall of a cylindrical bore 3a formed in a block 3 which may have cylindrical or rectangular outer walls 3b. A pair of punches 4 and 5 which are movable axially or along an X-axis are inserted in the cylindrical bore 3a one from each end, and are advanced slidably therein to define the initial volume of the receptacle 2 conforming to the size of the body 1. The body 1 may be a precompacted cylindrical block having a predetermined diameter. Preferably, a mass of finely grained graphite-carbon powder may be loaded in the receptacle 2 to constitute the initial carbon body 1 to eliminate the separate step of precompaction.

In forming operation, the punches 4 and 5 in the bore 3a are axially advanced toward each other to compress the body 1 until a predetermined reduction of the volume of the receptacle 2 and hence of the body 1 is attained. The block 3 is constructed to be sufficiently rigid to maintain itself and the body 1 against lateral expansion. The initial step of pressurization is followed by simultaneous heating and pressurization. It is essential that the body 1 be held under pressure exerted by the punches 4 and 5 and be heated to an elevated temperature and for a period such that a central portion of the body 1 is liquefied as shown at 6. While the remainder thereof is sintered or becomes coherent substantially in the solid state. The pressure preferably ranges in excess of 50 tons/cm$^2$ and, more preferably, in excess of 100 tons/cm$^2$. To protect the block 3 against excessive heating, the wall 3a of the bore 3 or the body 1 may have a ceramic or like heat-resistant coating applied thereon. To assist the body 1 under simultaneous heating and axial pressurization to resist lateral expansion, a heat-resistant ribbon wire coil 7 composed of carbon fiber is securely seated on the wall of the bore 3a, running spirally around the body 1.

Heating to cause a central portion of the body 1 under pressure to liquefy and the remainder thereof to be sintered may be effected by passing a high-amperage electric current preferably directly though the body 1. To this end, an electrical power supply 8 is provided having one pole electrically connected to the upper punch 4 and the other pole electrically connected to the lower punch 5 to pass resistive heating current between these punches 4 and 5 through the body 1. The punches 4 and 5 which serve as electrodes may be of a graphite-carbon material, preferably made according to the method of this invention. Likewise, the block 3 may be of a graphite-carbon material, preferably made according to the present method. The heating current may also be passed selectively through the block 3 to externally heat the body 1 or may be passed both through the body 1 and through the surrounding block 3.

Subsequent to the selective liquifaction of a center region 6, the body 1 is allowed to cool while held under pressure exerted by the punches 4 and 5 to solidify the liquefied region. It has been found that the central region 6 of the body 1 which is liquefied and solidified is substantially spherical in shape.

EXAMPLE I

A cylinder and punch arrangement as generally shown in FIG. 1 is used to form a cylindrical receptacle 2 having a diameter of 100 mm in which a mass of powdery graphite carbon of 100 mesh particle size is loaded to constitute the carbon body 1. The body is compressed between punches 4 and 5 under a pressure of 200 tons/cm$^2$. The body 1 held under pressure is heated by passing therethrough an electric current of a current density of 2500 amperes/cm$^2$ for a time period of 40 minutes and subsequently is allowed to cool. It is found that the resulting body is extremely hard, having a central region once liquefied and then solidified in a spherical shape during the process, and has a density of 96% and a crushing strength of 750 kg/cm$^2$.

The receptacle 2 in the arrangement of FIGS. 2 and 3 is rectangular for retaining a rectangular columnar precompact or powdery mass of carbon material 1 therein and is defined by a pair of blocks 9 and 10 and another pair of blocks 11 and 12 as well as the punches 4 and 5. The blocks 9 and 10 have their body retaining surfaces 9a and 10a orthogonal to a Y-axis and the blocks 11 and 12 are inserted into the space defined by the surfaces 9a and 10a and driven axially slidably therewith to apply pressures from mutually opposite directions of Z-axis orthogonal to the Y-axis while the punches 4 and 5 are driven to apply pressures from opposite directions along the X-axis orthogonal to the Y- and Z-axes. Further pressures is applied externally to the blocks 9 and 10 in the opposite directions of the Y-axis to hold against expansion in these latter directions by the body compressed by the X-axis drives 4 and 5 and the Z-axis drives 11 and 12. With the body 1 held under two- or three-dimensional pressurization, it may be heated here again by the resistive heating current passed therethrough from the supply 8 to a sufficient high temperature and for a sufficient time period as to cause a center region 6 to be fully liquefied in a substantially spherical form and the remainder to be sintered. It is essential that the body 1 be cooled while continuingly under pressure to form an improved carbon material.

FIG. 4 shows a further, preferred arrangement for pressurizing in which each pair of blocks 4 and 5 (not shown); 9 and 10; 11 and 12 are driven in opposite directions to apply pressure along their own axes, X, Y, Z so that the body is compressed three-dimensionally. The receptacle 2 which is defined by these blocks is shown to be rectangular. In this arrangement, the side wall 9b, 10b of the block 9, 10 is arranged to slide on the surface 12a, 11a of the block 12, 11 while the blocks 9 and 10 are being driven towards each other across the body 1 along the Y-axis. Likewise, the side walls 11b, 12b of the blocks 11, 12 are arranged to slide on the surface 9a, 10a while the blocks 11 and 12 are driven toward each other across the body 1 along the Z-axis. The upper and lower blocks or punches 4 and 5 though not shown in this FIGURE are likewise arranged so that the volume of the receptacle 2 is reduced gradually as the blocks 4 and 5; 9 and 10; and 11 and 12 are driven simultaneously or successively from one pair to another or from one block to another. Here again, while under the pressure, the body 1 is heated to an elevated temperature and for a period such as to form one or more liquefied regions 6 in a central zone of the body 1 and is then cooled to solidify these regions surrounded by the region which is simply sintered or made coherent in a solid state.

EXAMPLE II

A press arrangement as generally shown in FIGS. 2 and 3 is used to form a cubic carbon material 1 of 1 cm$^2$ from a mass of powdery graphite carbon of a particle size of 100 mesh. A pressure of 200 tons/cm$^2$ is applied two-dimensionally to the mass while resistive heating current is passed directly through the mass with a current density of 2500 amperes/cm$^2$ for a time period of 40 minutes. It is found that the resulting body develops therein spherical regions solidified after liquefaction surrounded by a sintered matrix. The body is extremely hard and has a density of 98% and a crushing strength of 980 kg/cm$^2$.

EXAMPLE III

EXAMPLE II is followed using a mass which contains 10% by weight a petroleum pitch and the balances graphite carbon previously treated to remove valatile components therefrom. The mass is preliminarily baked under a pressure of 2 tons and with heat delivered at 0.5 kilowatts/gram thereto. The preliminarily baked body is pulverized into a powder of 100 microns to constitute the mass 1 of carbon material of EXAMPLE II and is loaded into the arrangement of FIG. 4. The carbon product that results has a density of approximately 100% and a crushing strength of 1000 kg/cm$^2$.

What is claimed is:

1. A method of forming a shaped carbon material, comprising the steps of:

disposing a uniform body consisting of graphite carbon of a preselected shape and dimension in a collapsible receptacle so shaped and dimensioned as to tightly retain said body therein, said receptacle being collapsible at least one-dimensionally under an elevated external pressure while holding the body against expansion;

pressurizing said receptacle externally thereof in the mutually opposite directions along at least one of three mutually orthogonal axes (X, Y, Z) to establish said elevated pressure sufficient to collapse and reduce the volume of said receptacle wholly occupied by said body, thereby compressing said body in said directions without consequential substantial dimensional increase in any other direction;

heating said body tightly retained in and being compressed by said collapsing receptacle under said elevated external pressure at a temperature and for a time period which are sufficient to selectively liquefy in a substantially spherical form at least one discrete region internally located of said uniform graphite carbon body and to sinter the remainder thereof; and subsequently, solidifying said liquefied region while leaving a sintered matrix therearound of said body by cooling said heated body while said body continues under said external pressure in said receptacle.

2. The method defined in claim 1 wherein said receptacle is collapsed two-dimensionally.

3. The method defined in claim 2 wherein said receptacle is collapsed three-dimensionally.

4. The method defined in claim 1 wherein said body is a mass of powdery graphite carbon.

5. The method defined in claim 1 wherein said body is precompacted graphite carbon.

6. The method defined in claim 1 wherein said body is heated by passing a high-amperage electric current through said body.

7. The method defined in claim 1 wherein said body is compressed and heated to produce a plurality of such liquefied discrete regions in a distributed manner in said body.

8. The method defined in claim 1 wherein said shaped carbon material has a density of at least 96% of the theoretical value and a crushing strength of 750 to 1000 $kg/cm^2$.

9. The method defined in claim 1 wherein said elevated pressure is in an excess of 50 tons per $cm^2$.

* * * * *